G. J. FERGUSON.
VALVE.
APPLICATION FILED DEC. 6, 1909.
1,152,888.
Patented Sept. 7, 1915.
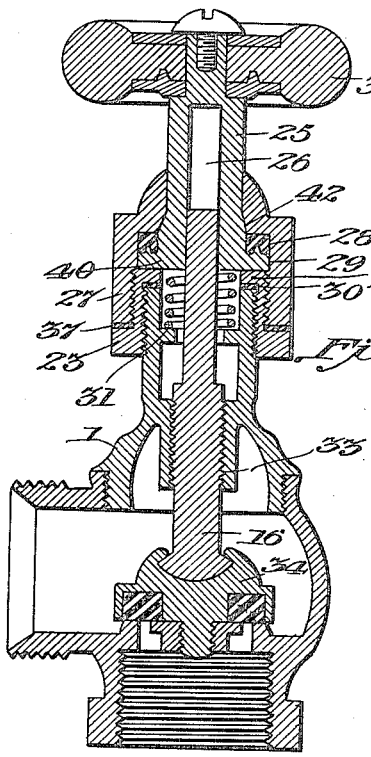
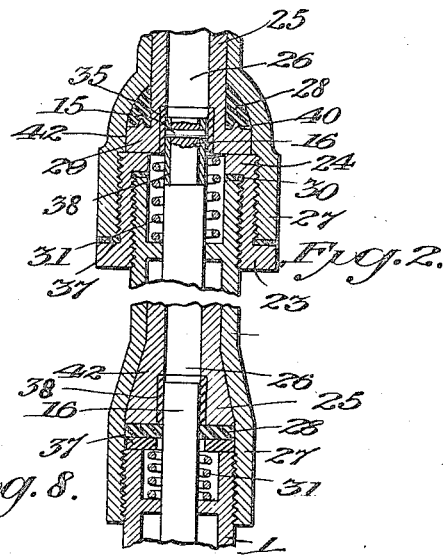
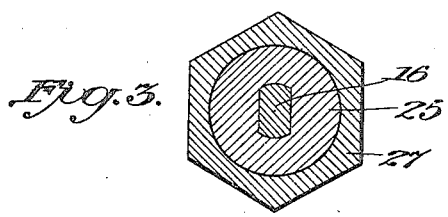
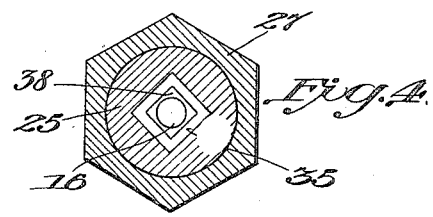
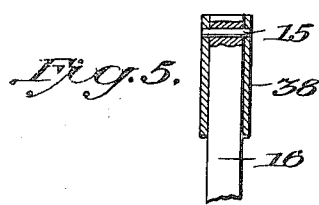
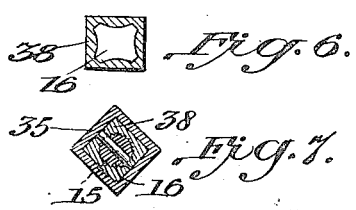
Witnesses:
D. F. Hensley
G. Hensley
Inventor:
Geo. J. Ferguson

UNITED STATES PATENT OFFICE.

GEORGE JONES FERGUSON, OF ST. LOUIS, MISSOURI.

VALVE.

1,152,888.

Specification of Letters Patent. Patented Sept. 7, 1915.

Application filed December 6, 1909. Serial No. 531,735.

*To all whom it may concern:*

Be it known that I, GEORGE JONES FERGUSON, a subject of the King of Great Britain, residing at St. Louis, State of Missouri, have invented certain new and useful Improvements in Valves, of which the following is a specification.

My invention relates to improvements in valves, whereby any globe, angle, or gate valve can be remodeled while in service and without removal, to make the valve stem self-packing.

The principal object of my invention is to remodel the valve stem so it will be self-packing by either of the following methods, by cutting it in an angular shape, by forming it corrugated and pressing or shrinking a thimble having a rough interior surface upon the stem, the exterior of the thimble being of angular shape, or by shrinking the thimble on the valve stem and drilling a hole through the thimble and stem and securing it by a rivet, in order to provide an angular apex on the valve stem adapted to slide within the angular socket formed within the rotary non-sliding socket extension stem having a wide radial flange, and the handle by which the valve is opened and closed, also to provide a bushing to increase the diameter of the bearing for the radial flange on the handled extension socket stem, the perfection of the joint between the compression nut and the rotary extension socket stem being secured by acutely tapering surfaces, semi-flexible disks, and washers mounted upon annular rims embedded in the disks, all of which improvement can be applied without removing the valve, or discontinuing its regular service. The cost of removing the valve would often exceed the cost of my improvement.

Other objects of the invention will appear in the description and subjacent claims.

In the drawings: Figure 1 is a view of an angle-valve commonly used in steam heating apparatus. Upon the valve stem is shown a part of my improvement as applied in a new valve, except that in a new valve the bushing would be an integral part of the compression nut. Fig. 2, shows a modification of the packing disk, and the valve stem equipped with a thimble, and the angular socket lined with an angular bushing. Fig. 3, is a cross section view of the valve stems as in Fig. 1. Fig. 4, is a cross section view of the valve stems equipped with the thimble, and a bushing inside of the extension valve stem. Fig. 5, is a view in section of part of a stem and thimble. Fig. 6, is a view in cross section of a stem and thimble. Fig. 7, is a view in cross section of a stem and thimble riveted thereon. Fig. 8, is a modified form without the outside bushing, and having a long tapered contact surface between the extension socket valve stem and the retaining nut.

I will now describe my invention, like numbers indicating similar parts, in the specification and drawings.

Any kind or construction of valve equipped with a compression screw 33, can be remodeled with my invention, consisting mainly in the thimble 38 attached to the old valve stem to make it angular, a bushing 23 externally applied to the compression nut 1 to enlarge its upper surface at the inwardly projecting flange 24 to present a large bearing for the radial flange 29 on the socket extension valve stem 25, and the ability to apply these improvements without removing the valve. A new valve may be constructed with an angular apex on its valve stem integral therewith, but the thimble 38 presents a means to apply such angular apex of harder material; also the internal bushing 35 permits a like benefit within the socket 26.

In remodeling an old valve I remove the handle, packing nut, gland, and the packing from the stuffing box, cut off the old stem to the proper length and apply the thimble 38 which is the indispensable part of the remodeling feature. Then upon the compression nut 1 I screw the external bushing 23 which has an internal thread made to fit upon the thread on the compression nut 1. The main object of this external bushing 23 is to increase the bearing surface for the radial flange 29 on the extension socket valve stem 25, and also of the disks 28, in order to augment the stability of said socket stem 25. The bushing 23 is provided with an external thread on which to screw the retaining nut 27, and an inwardly projecting flange 24 having its inner edge flush with the inner wall of the old stuffing box, and between the flange 24 and the end of the compression nut 1 I place a lead washer 30 to insure a permanent joint as the bushing 23 need not be removed during the life of the valve. The thimble 38 and the external bushing 23 are the prime factors in enabling me to remodel any type of valve while in service and without removal, and further that these parts enable me to provide a practical self-packing and self-fitting joint. The upper surface of the bushing 23 at the flange 24 is machined true and upon it rests and rotates the radial flange 29 of the extension socket valve stem 25, and within the socket 26 vertically slides the lower valve stem 16 whose flattened shape as shown in Fig. 3, or its angular form as shown in Fig. 4, preventing it from turning in the socket 26 but it is free to slide up, or down vertically in the socket 26, which may have the internal bushing 35 (Fig. 4) made of a harder material to increase its durability, and the angular thimble 38 on the valve stem 16 may also be made of a more durable material than that composing the valve stem 16.

The thimble 38 can be shrunk upon the round valve stem 16 and riveted at 15 as shown in Fig. 7, or the valve stem 16 may have shallow grooves cut in it as in Fig. 6 and a similar internal surface in the thimble 38, but I prefer that the internal surface of the thimble 38 will merely be roughed when drawn over a mandrel and either pressed, or shrunk upon the valve stem 16. This construction will obviate the necessity for refitting the old valve stem 16 as the rough interior of the thimble 38 as shown in Fig. 7 will bite into the round valve stem 16 when the rivet 15 will add to its security.

The extension socket valve stem 25 is held in position by the retaining nut 27 which screws upon the external thread on the bushing 23, a semi-compressible washer 37 being placed between the retaining nut 27 and the bushing 23 to permit the retaining nut 27 to be easily adjusted in regard to its proper tightness upon the disk 28 also semi-compressible, and the flange 29. The composition disk 28 in combination with the acutely tapering shape as shown in Fig. 2, and the corresponding tapering interior form of the retaining nut 27 is a modification of my self-packing joint. I will more particularly describe the relation of these self-packing parts. The extension socket valve stem 25 being equipped with the annular upward projecting rib 40, Figs. 1 and 2, which makes a corresponding dent in the disk 28 and positively prevents any leakage past it. A spring 31 may be placed in the original stuffingbox to keep the flange 29 having the annular rib 40 constantly bearing against the disk 28 regardless of whether there is pressure in the valve or not, but it will be understood that the steam or other pressure will exert a slight pressure on these parts.

In Figs. 1, and 8, the extension socket valve stem 25 is formed in an acute taper above the disk 28 in order to permanently guide the extension socket valve stem 25 in a true plane by automatically taking up all of the wear of said stem 25 and that of the interior of the retaining nut 27. This construction is essential in a self-packed structure as it is evident that it must also be self-fitting, or else these parts will quickly deteriorate by assuming a wabbling motion destroying their efficiency.

In Fig. 2, the acute taper is in the disk 28. This form of the disk will make it self-fitting as it rotates in the similar shaped interior of the retaining nut 27.

Fig. 8, more particularly shows a modification wherein the long acute taper surface 42 being ground to a fit and the gasket 28 being composed of a material immune to the action of fluids such as acids, chemicals, or ammonia. In this construction I can omit the bushing 23 and reduce the external size of the retaining nut 27, and it seems best adapted for valves when frequent opening and closing is necessary as the long acute taper 42 secures a permanent bearing and also provides a tight joint should the disk 28 become disintegrated, or broken. The disk 28 in Fig. 2, may also be constructed to withstand acids, and corrosive fluids.

My invention consists broadly in an acutely tapering self-packing and self-fitting detachable construction of the extension socket stem, either with or without compressible disks. Said disks can be conical in elevation, or a combination of acute metal surfaces and disks, and said disks regardless of shape may be made of special composition or of lead, or of any suitable material to withstand corrosive fluids passing therethrough, or an acute metal surface and flat disks or gaskets, such structures being particularly adapted to enable the remodeling of any type of valve into a self-fitting and self-packing element, and further to enable the remodeling of valves in place without removal, and during service I provide the angular thimble 38 to be either shrunk or pressed onto the valve stem. I also provide the external bushing 23 whereby sufficient surface is secured to permit of adding surface to the moving parts to insure a durable and permanently tight joint in the self-packing structure.

What I claim as new, is :

1. In a compression valve, a valve stem, an angular thimble secured to said stem, and an extension stem having an angular socket engaging said thimble.

2. In a compression valve, a valve stem, an angular thimble secured thereto, and an extension stem carrying a handle and having an angular socket engaging said thimble.

3. In a compression valve, a stem of circular cross section, and a thimble secured to said stem and having an angular periphery and a roughened interior engaging said stem.

4. In a compression valve, a valve stem, an angular thimble secured thereto, and an extension stem carrying a handle and having an angular socket lined with an angular bushing engaging said thimble.

5. In a compression valve, a compound valve stem having an angular portion, and an angular socket surrounding such portion, a compression nut, a bushing having an interior thread engaging said nut, a retaining nut engaging exterior threads on said bushing and retaining the outer portion of the compound stem, said bushing having an inwardly projecting flange between said outer portion and the compression nut.

6. In a compression valve, a compound valve stem having a sliding portion and a rotary portion, a thimble having an angular exterior and secured upon the sliding portion, the rotating portion having a socket fitting said thimble and having a radial flange and an exterior tapering portion, a compression nut, a bushing surrounding said compression nut, a retaining nut coacting with said tapered portion and said bushing to retain said rotating stem portion, and packing between said retaining nut and said stem portion.

7. In a compression valve, an angular stem, a stem extension having an angular socket fitting said stem and having a radial flange provided with an annular rib, a disk pressing upon said flange, a compression nut, a bushing surrounding said compression nut and having an inwardly projecting flange between said compression nut and said stem extension, a retaining nut coöperating with the bushing and having a tapered portion coöperating with the tapered portion on the said extension to retain the said extension in place.

8. In a compression valve, a stem portion, a thimble having an angular periphery and secured to said stem portion, a stem extension having an angular socket to engage said thimble, a compression nut, a bushing secured thereto, and a retaining nut secured to the bushing and engaging a tapered portion on the stem extension to retain the latter in place.

9. In a compression valve, a valve stem having an angular end, a stem extension having an angular socket engaging said end, and having a radial flange with an annular rib thereon, a packing disk pressed on said rib, a compression nut, a bushing mounted on said compression nut and having a flange providing an enlarged bearing surface for said radial flange, a retaining nut engaging said bushing and tapered to engage a tapered portion on said stem extension to retain the latter, and a spring interposed between said compression nut and said stem extension.

10. In a compression valve, a compound valve stem comprising an inner threaded stem having an angular end, a rotary stem extension having an angular socket fitting said end and a radial flange with an annular rib, a packing disk pressed upon said rib, a compression nut, a bushing secured to said nut and having a portion underlying said radial flange and externally threaded, a retaining nut threaded to said bushing to secure the stem extension, and a spring interposed between the compression nut and the stem extension.

11. In a compression valve, a compound valve stem comprising a lower threaded stem, a thimble surrounding the end of said stem, a stem extension having a socket fitting said thimble and a radial flange provided with an annular rib, a conical disk pressed upon said rib, a compression nut having a threaded portion coöperating with said lower stem, and a retaining nut fitting to said disk and attached to said compression nut.

12. In a compression valve, a compound valve stem comprising a lower threaded stem having an angular end, an upper stem portion having an angular socket fitting said end and having a radial flange carrying an annular rib, a packing disk pressed upon said rib, said upper stem portion having a tapered part, a compression nut screw threaded to receive said lower stem, a bushing surrounding the compression nut and having an inwardly projecting flange between said compression nut and said upper stem portion, and a retaining nut coöperating with said tapered part and said bushing to retain the upper stem portion.

13. In a compression valve, a compound valve stem comprising a lower threaded stem swivel jointed to a valve head and having an angular end, an upper stem portion having an angular socket surrounding said angular end and having a long tapering part and a radial flange, a packing disk pressed upon said flange, a compression nut threaded to receive the lower stem, and a retaining nut coöperating with the compression nut and said tapered part to retain the upper stem portion.

GEORGE JONES FERGUSON.

Witnesses:
GEORGE K. FERGUSON,
DOROTHY F. HENSLEY.